(12) United States Patent
Cunha et al.

(10) Patent No.: US 7,255,536 B2
(45) Date of Patent: Aug. 14, 2007

(54) TURBINE AIRFOIL PLATFORM COOLING CIRCUIT

(75) Inventors: Frank J. Cunha, Avon, CT (US); Eric Couch, South Windsor, CT (US); Keith A. Santeler, Middletown, CT (US); Scott W. Gayman, Manchester, CT (US); Eric A. Hudson, Harwinton, CT (US); Christopher Joe, Wethersfield, CT (US); Eric Letizia, East Hartford, MI (US)

(73) Assignee: United Technologies Corporation, Hartford, CT (US)

( * ) Notice: Subject to any disclaimer, the term of this patent is extended or adjusted under 35 U.S.C. 154(b) by 87 days.

(21) Appl. No.: 11/134,927

(22) Filed: May 23, 2005

(65) Prior Publication Data

US 2006/0263221 A1    Nov. 23, 2006

(51) Int. Cl.
*F01D 5/18* (2006.01)
(52) U.S. Cl. .................... 416/97 R; 416/193 A
(58) Field of Classification Search .............. 416/1, 416/97 R, 193 A
See application file for complete search history.

(56) References Cited

U.S. PATENT DOCUMENTS

| | | | |
|---|---|---|---|
| 2,844,855 A * | 7/1958 | Tedds et al. .................. 164/10 |
| 5,197,852 A * | 3/1993 | Walker et al. ............... 415/115 |
| 5,419,039 A * | 5/1995 | Auxier et al. .......... 29/889.721 |
| 6,017,189 A * | 1/2000 | Judet et al. ................ 416/97 R |
| 6,120,249 A * | 9/2000 | Hultgren et al. .......... 416/97 R |
| 6,254,333 B1 * | 7/2001 | Merry ......................... 415/115 |
| 6,390,774 B1 | 5/2002 | Lewis et al. |
| 7,097,424 B2 * | 8/2006 | Cunha et al. .............. 416/97 R |

OTHER PUBLICATIONS

U.S. Appl. No. 10/637,352, entitled "Microcircuit Airfoil Main Body," filed Aug. 8, 2003.
U.S. Appl. No. 10/979,597, entitled Airfoil with Serpentine Cooling Channel and Microcircuit, filed Nov. 2, 2004.

* cited by examiner

*Primary Examiner*—Ninh H. Nguyen
(74) *Attorney, Agent, or Firm*—Carlson, Gaskey & Olds

(57) ABSTRACT

An airfoil assembly includes an airfoil extending away from a platform. One or more cooling circuits are formed through the platform in order to provide cooling of the platform. The cooling circuit may include a downwardly directed inlet receiving cooling air from below the platform. The cooling air is then directed in a direction generally parallel to the outer surface of the platform and through exits formed through the outer surface of the platform. The cooling circuit may optionally include a plurality of pedestals extending from an outer wall to an inner wall of the cooling circuit to increase the rigidity and the cooling function of the cooling circuit.

16 Claims, 3 Drawing Sheets

TURBINE AIRFOIL PLATFORM COOLING CIRCUIT

This invention was made with Government support under F33615-03-D-2354 awarded by the United States Air Force. The Government has certain rights in this invention.

BACKGROUND OF THE INVENTION

The present invention relates generally to gas turbine engines and more particularly to a cooling circuit for a platform of a turbine airfoil.

Turbine blades in a gas turbine engine extend outwardly from a turbine blade platform. In operation, the turbine blades are routinely exposed to temperatures well above their material limits. In existing engines, air from the compressor section of the turbine engine is used to cool the blade material. This cooling air is fed to the blade through a series of rotor cavities underneath the blade platform. The cooling air is then injected into the hot mainstream flow through openings in the sealing area.

Without sufficient cooling of the platform, the platform walls may experience creep deformation. High temperature gradients in the platform may result in thermal-mechanical fatigue. Additionally, the high temperatures can cause oxidation of the platforms.

SUMMARY OF THE INVENTION

The present invention provides a cooling circuit for a turbine airfoil platform. The cooling circuit permits higher inlet temperatures than the current airfoil assembly designs.

In a disclosed embodiment of the present invention, the cooling circuit cools the pressure side of the platform, while another cooling circuit cools the suction side of the platform. In general, the inlet of each cooling circuit receives cooling air from the rotor cavity below the platform. The cooling air flows through each circuit and cools the walls of the platform.

Optionally, at least the suction side of the cooling circuit includes a plurality of pedestals extending between top and bottom walls of the cooling circuit. The pedestals are positioned inside the circuit to provide structural integrity and stiffness for the platform. The pedestals also turbulate the flow and enhance cooling by increasing the internal heat transfer coefficients. The pedestals also provide increased surface area for cooling and provide conduction paths between the outer and inner wall of the cooling circuit.

The exit of each cooling circuit drives the cooling air in such a way as to provide the film coverage on the platform. This film blanket of cooling air further protects the platform walls from the hot gas recovery temperatures.

BRIEF DESCRIPTION OF THE DRAWINGS

Other advantages of the present invention can be understood by reference to the following detailed description when considered in connection with the accompanying drawings wherein.

DETAILED DESCRIPTION OF A PREFERRED EMBODIMENT

Figure 1:
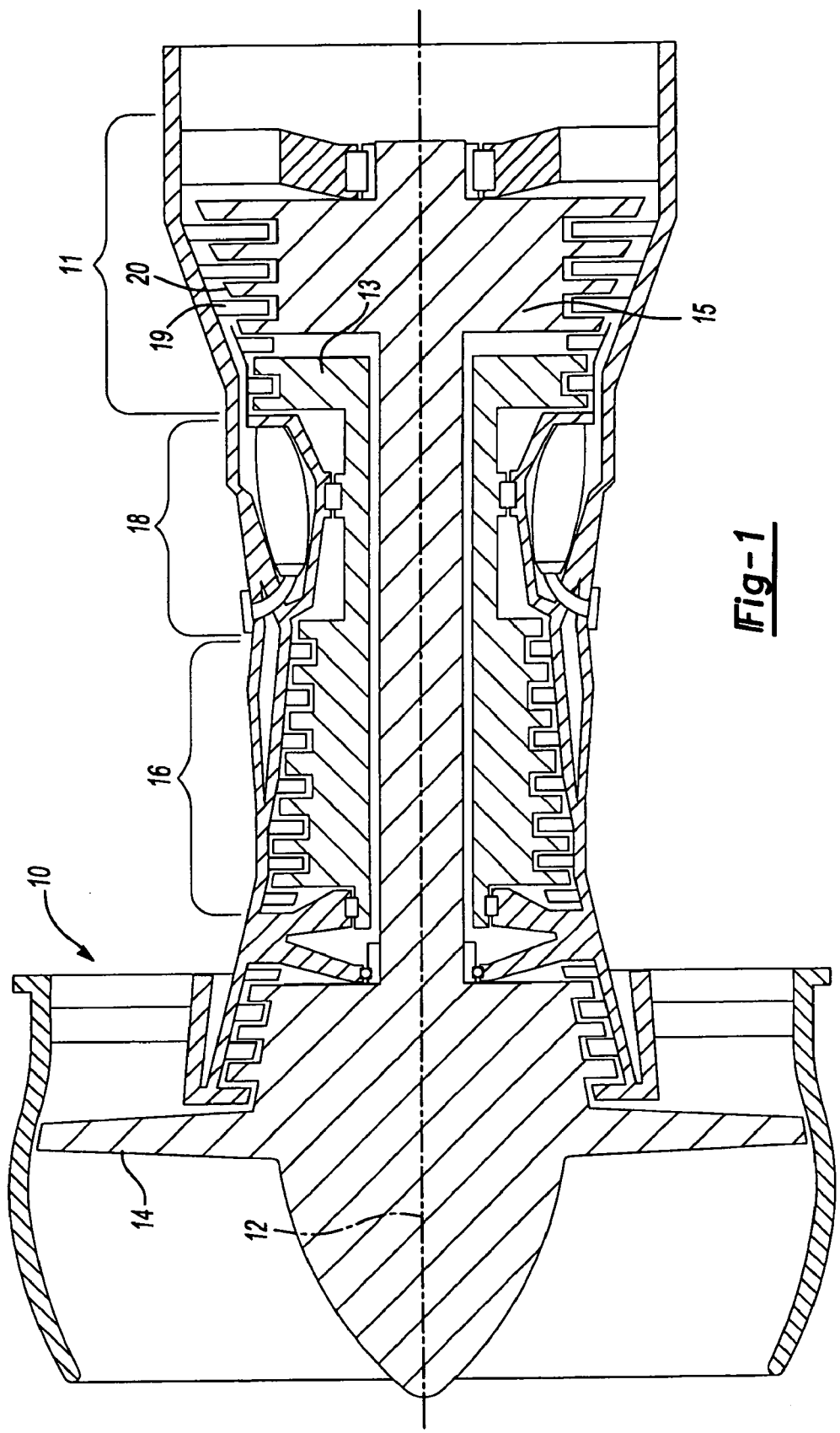
FIG. 1 is a schematic of a gas turbine engine incorporating one embodiment of an airfoil assembly of the present invention.

FIG. 1 shows a gas turbine engine 10, such as a gas turbine used for power generation or propulsion, circumferentially disposed about an engine centerline or axial centerline axis 12. The engine 10 includes a fan 14, a compressor 16, a combustion section 18 and a turbine 11. As is well known, air compressed in the compressor 16 is mixed with fuel that is burned in the combustion section 18 and expanded in turbine 11. The turbine 11 includes rotors 13 and 15 that rotate in response to the expansion, driving the compressor 16 and fan 14. The turbine 11 compresses alternating rows of turbine blades 20 and vanes 19. FIG. 1 is a somewhat schematic presentation for illustrative purposes only and is not a limitation on the instant invention, which may be employed on gas turbines for electrical power generation, aircraft, etc. Additionally, there are various types of gas turbine engines, many of which could benefit from the present invention, which is not limited to the design shown.

Figure 2:
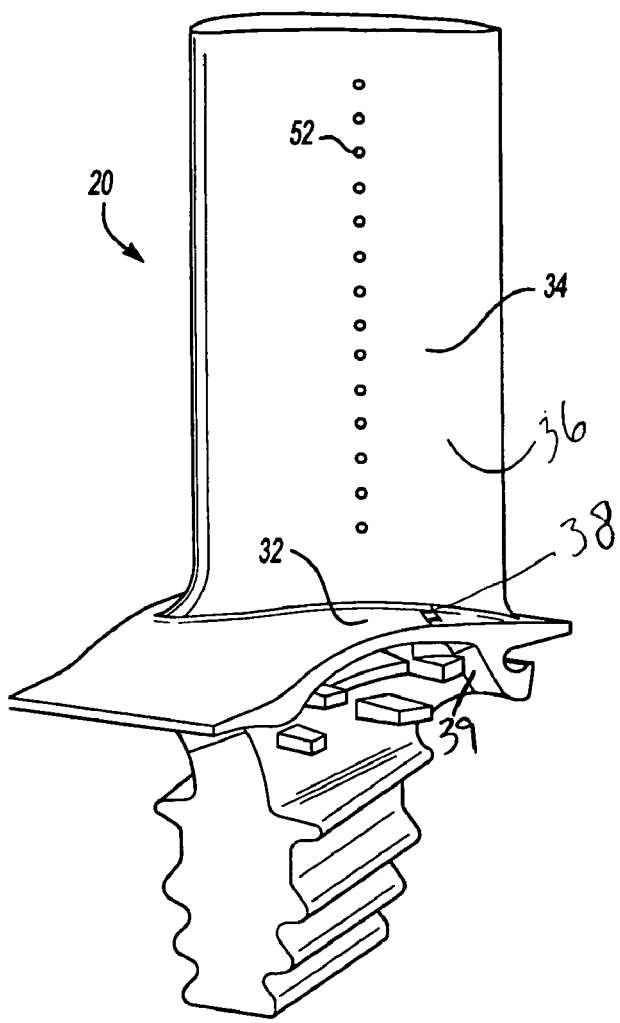
FIG. 2 is a turbine blade of FIG. 1.

A turbine blade 20 is illustrated in FIG. 2 having a platform 32 and an airfoil 34 extending outwardly away from the platform 32. While the present invention can be described with respect to its application in a turbine blade 20, the invention could also be utilized in a static structure such as a vane 19 (FIG. 1). The turbine blade 20 includes a pressure side 36 of the airfoil 34. A pressure side cooling circuit exit 38 is formed in the platform 32 on the pressure side 36 of the airfoil 34. A rotor cavity 39 is defined below the platform 32.

Figure 3:
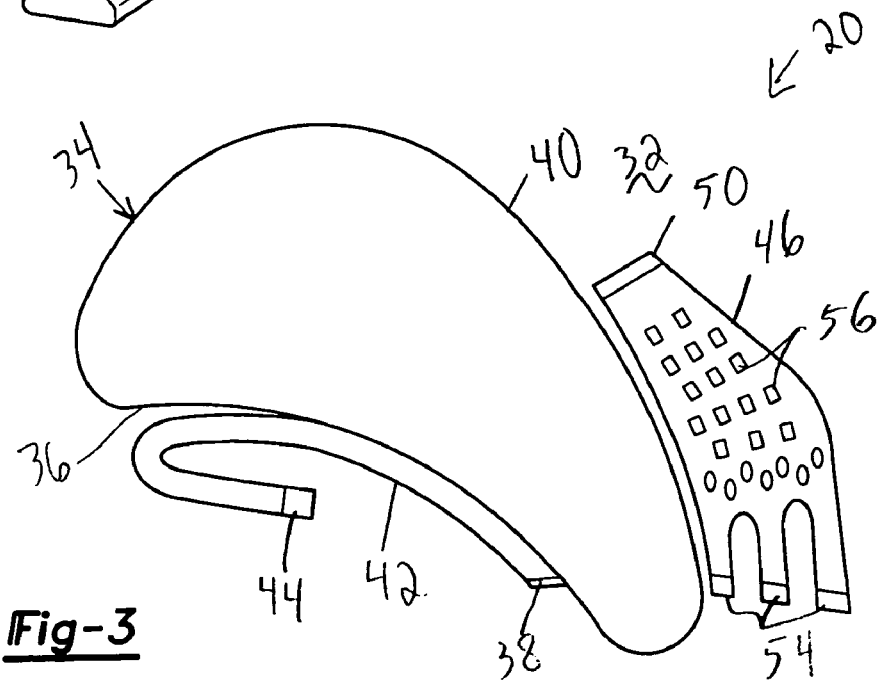
FIG. 3 is a plan view of the turbine blade of FIG. 2.

The turbine blade 20 further includes a suction side 40 of the airfoil 34 opposite the pressure side 36, as shown in FIG. 3. FIG. 3 is a plan view of the turbine blade 20, schematically showing the location of a pressure side cooling circuit 42 and a suction side cooling circuit 46 which are contained within the platform 32 and lead to a pressure side cooling circuit exit 38 and suction side cooling circuit exit 54 on the upper surface of the platform 32. As shown in FIG. 3, the pressure side cooling circuit 42 further includes a pressure side cooling circuit inlet 44. The suction side cooling circuit 46 includes an inlet 50 opposite the exits 54. The suction side cooling circuit 46 may further include a plurality of pedestals 56.

Figure 4:
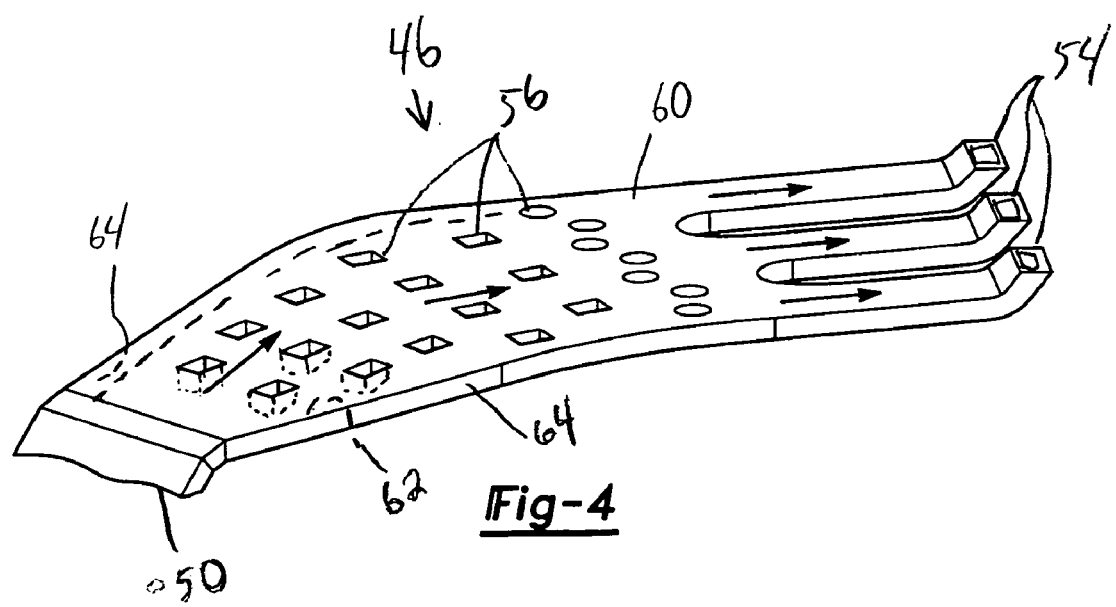
FIG. 4 is a perspective view of the suction side cooling circuit of FIG. 3.
Figure 5:
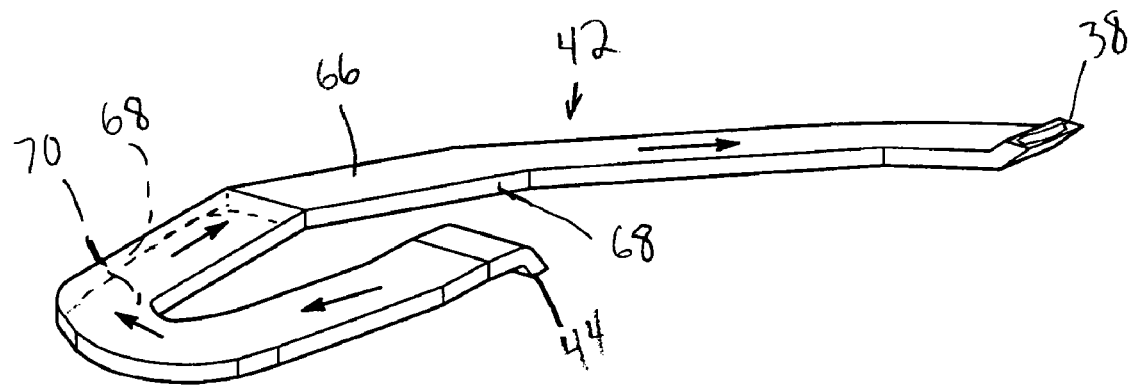
FIG. 5 is a perspective view of the pressure side cooling circuit of FIG. 3.

FIGS. 4 and 5 are perspective views of the suction side cooling circuit 46 and the pressure side cooling circuit 42, respectively. The cooling circuits 46, 42 in the embodiment shown are metal cores that are separately molded, cast and/or machined to the configurations shown and subsequently insert-cast into the platform 32 (FIGS. 2 and 3).

Referring specifically to the suction side cooling circuit 46 in FIG. 4, the core includes an outer wall 60 spaced above an inner wall 62. The outer wall 60 and inner wall 62 are connected by side walls 64. A cooling air path is defined between the outer wall 60, inner wall 62 and side walls 64 from the downwardly directed inlet 50 to the upwardly directed exits 54. A plurality of pedestals 56 connect the outer wall 60 and inner wall 62. The pedestals 56 increase the structural integrity and stiffness of the cooling circuit 46. The pedestals 56 also turbulate the flow and enhance the cooling by increasing the internal heat transfer coefficients. The pedestals 56 also provide increased surface area for cooling and provide conduction paths between the outer wall 60 and the inner wall 62 of the cooling circuit 46. The exits 54 from the cooling circuit 46 extend upwardly at an angle in order to provide the film coverage on the outer surface of the platform 32 (FIG. 2). The film blanket will protect the platform 32 from the hot gas recovery temperatures.

Referring specifically to the pressure side cooling circuit 42 in FIG. 5, the core includes an outer wall 66 opposite an inner wall 70 and connected by opposed side walls 68 to define a cooling path from a downwardly directed inlet 44 along a serpentine path to an upwardly directed exit 38. Although shown without pedestals, the pressure side cooling circuit 42 could optionally include the pedestals similar to those in the suction side cooling circuit 46 of FIG. 4. Again, the exit 38 on the pressure side cooling circuit 42 is directed upwardly at an angle and is elongated in order to provide film coverage on the outer surface of the platform 32 (FIG. 2).

Referring to FIGS. 2-5, in operation, cooling air from the rotor cavity 39 passes into the inlets 44, 50 of the cooling circuits 42, 46. The cooling air then travels through the cooing circuits 42, 46 in a direction generally parallel to the outer walls 60, 66 and inner walls 70, 62 to cool the platform 32. The air then exits the cooling circuits 42, 46 via the exits 38, 54 and forms a film blanket along the exterior surface of the blade platform 32.

The cooling circuits 42, 46 increase the thermal convective efficiency for increased heat pick-up. The internal heat transfer coefficients are increased as the metal temperature is decreased. The optional microcircuit pedestals 56 increase the stiffness and resistance to shear by improving rigidity of the turbine assembly and turbulate the cooling air flow. The slot exits 38, 54 provide improved film coverage of the platform 32. The platform 32 has increased material capability and resistance to creep deformation.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. An airfoil assembly comprising:
   an airfoil having a base end, an outer end, a leading edge upstream of a trailing edge, a pressure side and a suction side; and
   a platform connected to the airfoil with the base end of the airfoil proximate an outer surface of the platform and the outer end of the airfoil extending away from the platform, the platform including a cooling circuit having an inlet through an underside of the platform and an exit through the outer surface of the platform, the cooling circuit extending upstream from the inlet and then downstream to the outlet.

2. The assembly of claim 1 wherein the cooling circuit is a pressure side cooling circuit on the pressure side of the airfoil.

3. The assembly of claim 2 further including a suction side cooling circuit on the suction side of the airfoil.

4. The assembly of claim 1 wherein the cooling circuit includes a hollow metal core around which the platform has been cast.

5. The assembly of claim 1 wherein the cooling circuit includes a passage extending parallel to the outer surface of the platform between the inlet and the exit.

6. The airfoil assembly of claim 1 wherein the inlet is positioned near a midpoint between the leading edge and the trailing edge of the airfoil.

7. A cooling circuit for an airfoil platform comprising:
   an inner wall spaced away from the outer wall to define a cooling airflow passage therebetween;
   a downwardly directed inlet in communication with the cooling airflow passage; and
   a plurality of upwardly directed exits in communication with the cooling airflow passage, wherein the cooling airflow passage branches into a plurality of cooling exit passages, each of which leads to at least one one of the plurality of exits.

8. The cooling circuit of claim 7 further including a plurality of pedestals extending between the outer wall and the inner wall.

9. An airfoil platform assembly including the cooling circuit of claim 7, the assembly further comprising:
   a platform having an upper surface with a pressure side and a suction side; and
   the cooling circuit at least partially within the platform, the cooling circuit having the inlet on the platform and the exit through the upper surface of the platform.

10. The assembly of claim 9 wherein the cooling circuit is on the pressure side of the upper surface of the platform.

11. The assembly of claim 9 wherein the cooling circuit is on the suction side of the upper surface of the platform.

12. The assembly of claim 9 wherein the cooling circuit includes a plurality of pedestals extending between an outer wall and an inner wall.

13. The assembly of claim 9 wherein the cooling circuit is a hollow metal core integrally cast into the platform.

14. The cooling circuit of claim 7 wherein the cooling exit passages are each partially defined by a portion of the outer wall, and wherein the cooling exit passages each angle upwardly toward associated exits.

15. The cooling circuit of claim 7 further including a plurality of pedestals extending between the outer wall and the inner wall in the cooling airflow passage upstream of the cooling exit passages.

16. The cooling circuit of claim 15 wherein the plurality of pedestals includes a first plurality of pedestals each having a substantially flat leading surface and a second plurality of pedestals each having a substantially rounded leading surface, the second plurality of pedestals downstream of the first plurality of pedestals.

* * * * *

UNITED STATES PATENT AND TRADEMARK OFFICE
CERTIFICATE OF CORRECTION

| | | |
|---|---|---|
| PATENT NO. | : 7,255,536 B2 | Page 1 of 1 |
| APPLICATION NO. | : 11/134927 | |
| DATED | : August 14, 2007 | |
| INVENTOR(S) | : Cunha et al. | |

It is certified that error appears in the above-identified patent and that said Letters Patent is hereby corrected as shown below:

Claim 7, Column 4, line 18: delete the second occurrence of "one"

Signed and Sealed this

Thirteenth Day of November, 2007

JON W. DUDAS
*Director of the United States Patent and Trademark Office*